(12) United States Patent
Chang et al.

(10) Patent No.: US 8,886,494 B2
(45) Date of Patent: Nov. 11, 2014

(54) ELECTRONIC DEVICE AND METHOD OF OPTIMIZING MEASUREMENT PATHS

(75) Inventors: Chih-Kuang Chang, New Taipei (TW); Xin-Yuan Wu, Shenzhen (CN); Gen Yang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 387 days.

(21) Appl. No.: 13/287,135

(22) Filed: Nov. 2, 2011

(65) Prior Publication Data
US 2012/0185200 A1    Jul. 19, 2012

(30) Foreign Application Priority Data

Jan. 18, 2011 (CN) .......................... 2011 1 0020402

(51) Int. Cl.
*G01B 5/02* (2006.01)
*G01C 5/00* (2006.01)
*G06F 19/00* (2011.01)
*B25J 9/16* (2006.01)

(52) U.S. Cl.
CPC ..... *B25J 9/1664* (2013.01); *G05B 2219/37443* (2013.01)
USPC ............. 702/158; 33/700; 250/311; 700/173; 702/95

(58) Field of Classification Search
CPC .................. B25J 9/1664; G05B 2219/37443; G01S 13/82; G01S 5/0226; G01S 7/4004; G06K 7/00
USPC ........... 702/86, 94, 95, 97, 108, 149, 150, 55, 702/158, 161, 166, 167, 168, 170; 250/305, 250/310, 311; 700/173, 245; 33/533, 700
See application file for complete search history.

(56) References Cited

U.S. PATENT DOCUMENTS

| | | | |
|---|---|---|---|
| 6,563,116 B1 * | 5/2003 | Nikitin ........................ | 250/311 |
| 6,850,331 B1 | 2/2005 | Ferber et al. | |
| 7,210,242 B2 * | 5/2007 | Sun et al. ........................ | 33/533 |
| 8,010,224 B2 * | 8/2011 | Yamaguchi et al. .......... | 700/173 |

* cited by examiner

*Primary Examiner* — John H Le
(74) *Attorney, Agent, or Firm* — Novak Druce Connolly Bove + Quigg LLP

(57) ABSTRACT

A method of optimizing measurement paths analyzes one or more measurement points for each of the measurement elements of a product and generates relation arrays, each of the relation arrays storing the name and the one or more measurement points of one measurement element. The method selects a measurement point which is the nearest to the origin of an coordinate system of the product, computes distances between the measurement points from the selected measurement point using the relation arrays, and orders the measurement points according to the computed distances to generate a first ordered array. The method generates an optimal measurement path according to the first ordered array.

18 Claims, 7 Drawing Sheets

ELECTRONIC DEVICE AND METHOD OF OPTIMIZING MEASUREMENT PATHS

BACKGROUND

1. Technical Field

Embodiments of the present disclosure relate to devices and methods of product measurement, and more particularly to an electronic device and a method of optimizing a measurement path when the measuring device measures a product.

2. Description of Related Art

In the field of manufacturing, many products are measured by measuring machines. Usually, when the measuring machine measures a product, the measuring machine needs to move along a measurement path to take all measurements (e.g., measurement elements) of the product. The measurement elements include, for example, points, lines, planes, and circles.

Referring to FIG. 1, the measurement elements on the product are gathered from S1 to S9. Measurement elements S1, S4, S5, and S7 are circles, and represented using a symbol "O." Measurement elements S2, S3, and S6 are lines, and represented using a symbol "/." Measurement element S8 is a point, and represented using a symbol "." and measurement element S9 is a plane, and represented using a symbol "■." A measurement element is established by one or more points. For example, a line is established by at least two points, such as measurement element S2, which is established by the two points M5 and M6 in FIG. 1. A circle is determined by at least three points, such as measurement element S1, which is determined by the four points M1 to M4 in FIG. 1.

In the past, when a measuring machine measures a product, the measurement path of the measuring machine is determined by the order of how the measurement elements were established. Thus, an original measurement path of the measuring machine in FIG. 1 is from the points M1 to M4 of the measurement element S1, to the points M24 to M26 of the measurement element S9. From FIG. 1, it can be seen that, the measurement path is disordered, which may result in an increased length of time for taking the measurements.

DETAILED DESCRIPTION

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 2:
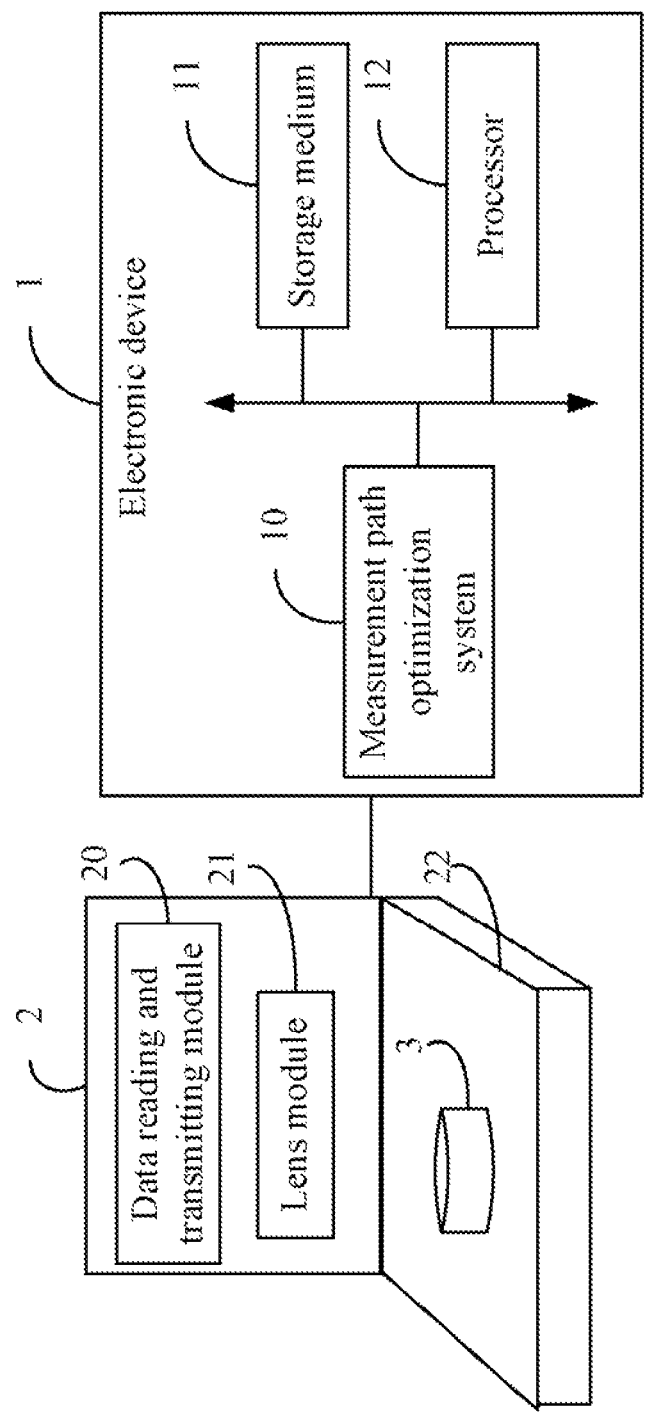
FIG. 2 is a block diagram of one embodiment of an electronic device including a measurement path optimization system.

FIG. 2 is a block diagram of one embodiment of an electronic device 1 including a measurement path optimization system 10. In the embodiment, the electronic device 1 further includes a non-transitory storage medium (hereinafter, storage medium) 11, and at least one processor 12. Depending on the embodiment, the storage medium 11 may be a hard disk drive, a compact disc, a digital video disc, a tape drive, or other suitable storage mediums.

Figure 1:
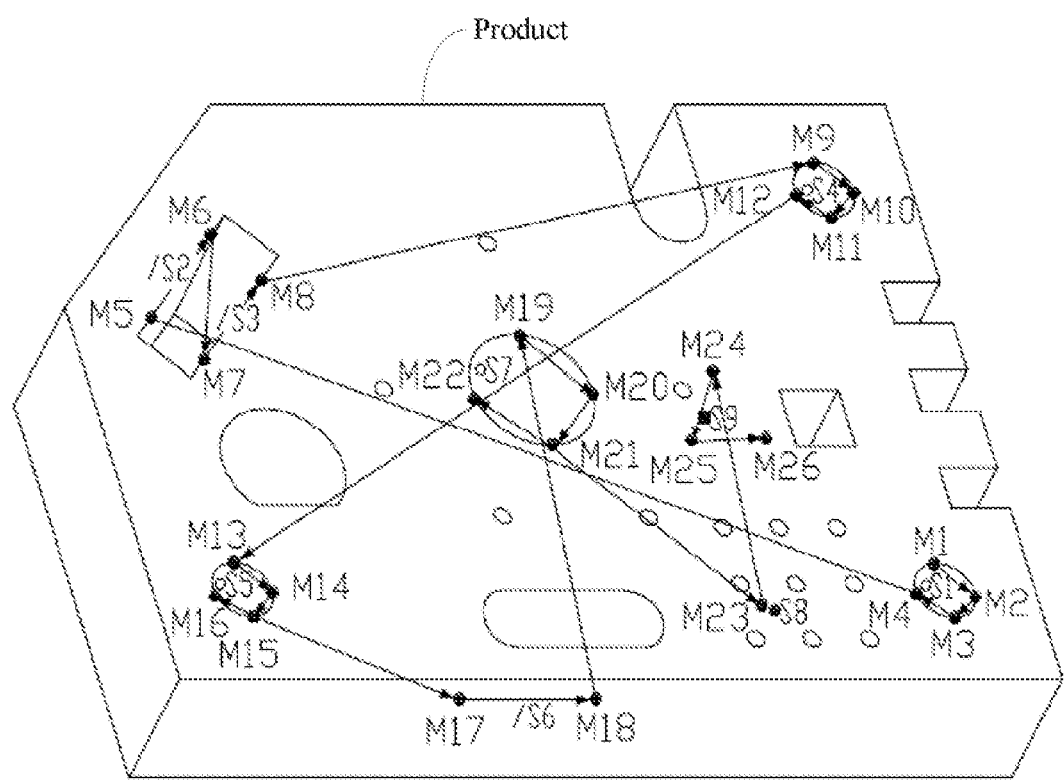
FIG. 1 is an example illustrating an un-optimal measurement path when a measuring machine measures a product.

The electronic device 1 is electronically connected to a measuring machine 2. The measuring machine 2 includes a data reading and transmitting module 20, a lens module 21, and a platform 22. Using the lens module 21, the measuring machine 2 captures images of a product 3 placed on the platform 22. The data reading and transmitting module 20 reads information of the product 3 and information of measurement elements of the product 3 from the images, and transmits the information to the electronic device 1. In one embodiment, the information of the product 3 includes a coordinate system of the product 3 and a minimum bounding box applicable to the product 3. The minimum bounding box is the smallest box that can enclose the entire product 3. The information of the measurement elements includes a name allocated to each of the measurement elements, a quantity of the measurement elements, the positional coordinates of each of the measurement elements, and a geometric value of each of the measurement elements. As mentioned above, the measurement elements may include points, lines, planes, and circles. The name allocated to a measurement element may be S1, S2, for example, as shown in FIG. 1. The positional coordinates of a measurement element are the coordinates of the points that establish the measurement element, such as the points M1 to M4 that determines the measurement element S1 in FIG. 1. The geometric value of a measurement element indicates whether the measurement element is a point, a line, a plane, or a circle. For example, a geometric value 1 may indicate that the measurement element is a point, a geometric value 2 may indicate that the measurement element is a line.

Figure 3:
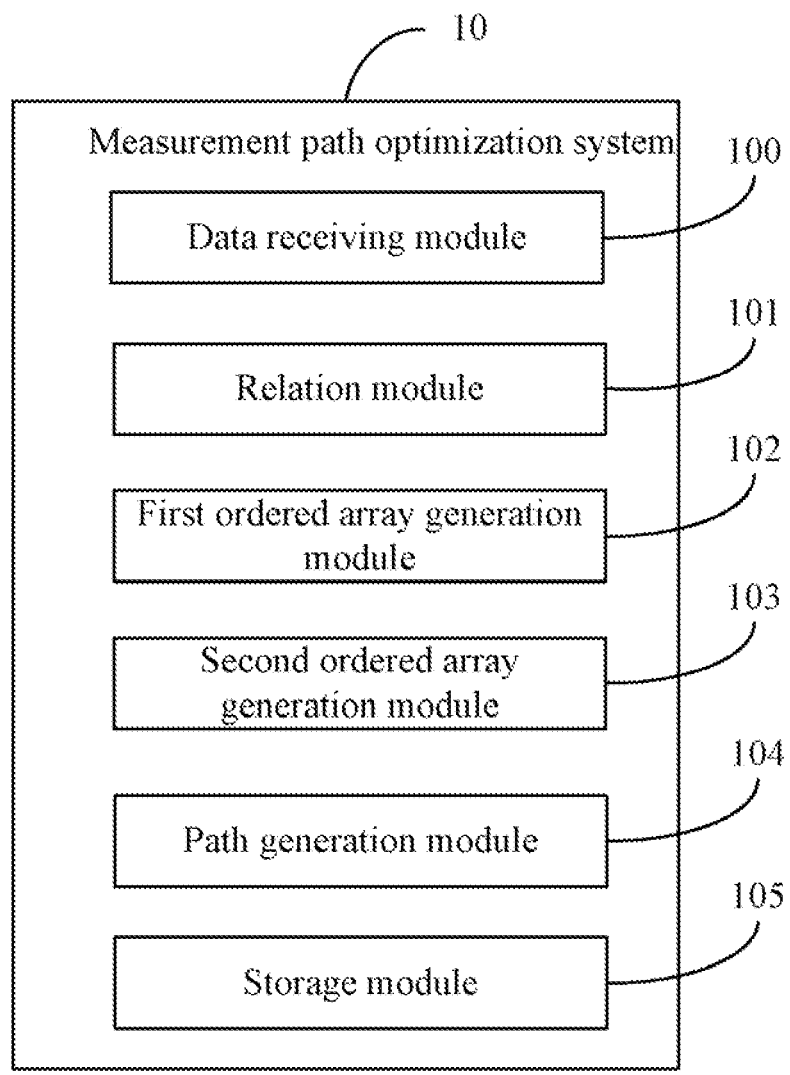
FIG. 3 is a block diagram of one embodiment of function modules of the measurement path optimization system of FIG. 2.

The measurement path optimization system 10 includes a number of function modules (depicted in FIG. 3). The function modules may comprise computerized code in the form of one or more programs that are stored in the storage medium 11. The computerized code includes instructions that are executed by the at least one processor 12, to determine an optimal measurement path when the measuring machine 2 takes measurements on the product 3 according to the above-mentioned information regarding each of the measurement elements on the product 3.

FIG. 3 is a block diagram of one embodiment of the function modules of the measurement path optimization system 10. In one embodiment, the measurement path optimization system 10 may include a data receiving module 100, a relation module 101, a first ordered array generation module 102, a second ordered array generation module 103, a path generation module 104, and a storage module 105. The function modules 100-105 may provide the below-mentioned functions (illustrated in FIG. 4).

Figure 4:
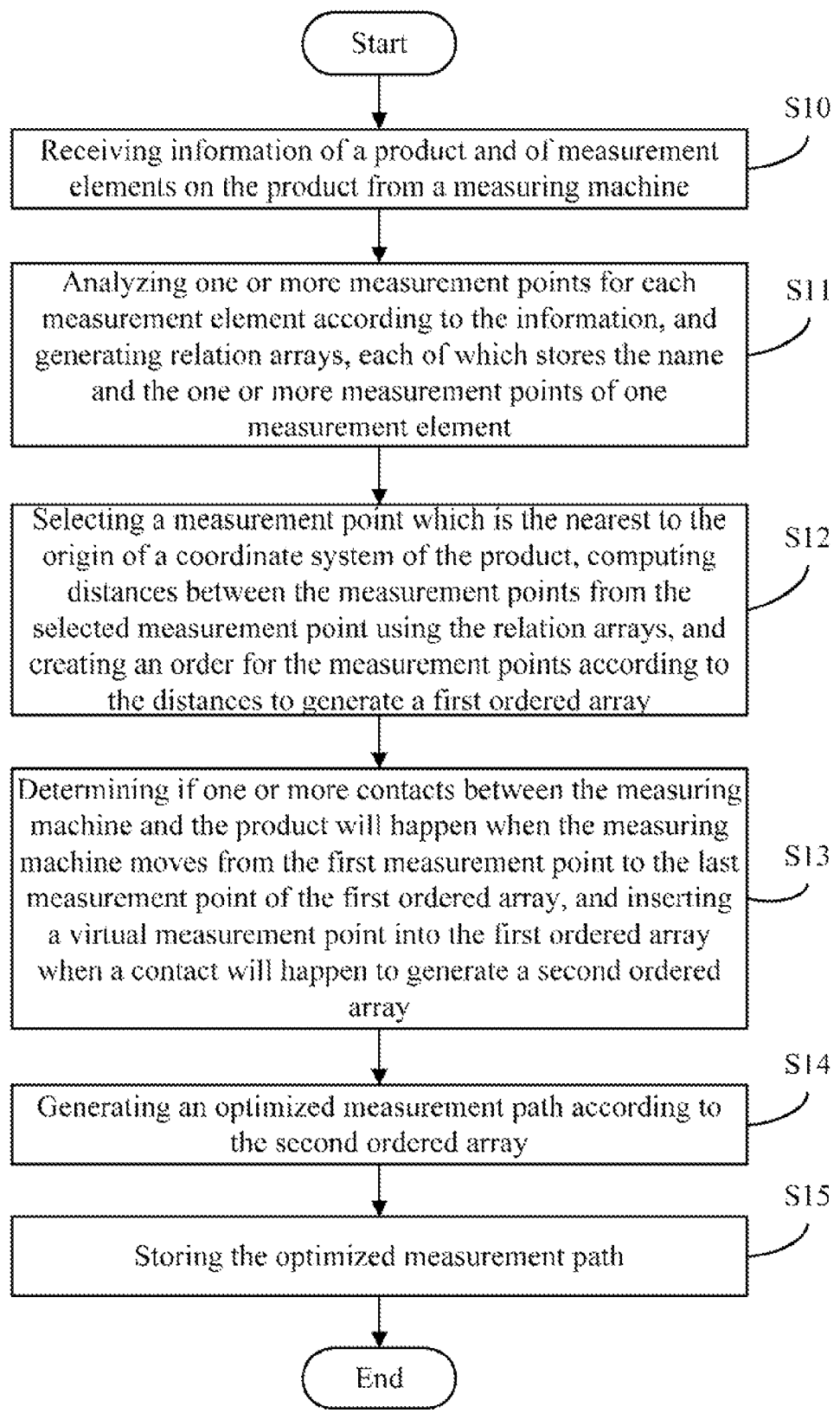
FIG. 4 is a flowchart of one embodiment of a method of optimizing measurement paths.

FIG. 4 is a flowchart of one embodiment of a method of optimizing measurement paths using the electronic device 1 of FIG. 2. Depending on the embodiment, additional blocks may be added, others removed, and the ordering of the blocks may be changed.

In block S10, the data receiving module 100 receives information of the product 3 and information of the measurement elements of the product 3 from the measuring machine 2. As mentioned above, the information of the product 3 includes a coordinate system of the product 3 and a minimum bounding box applicable to the product 3. The information of the measurement elements includes a name allocated to each of the measurement elements, a quantity of the measurement elements, the positional coordinates of each of the measurement elements, and a geometric value of each of the measurement elements.

In block S11, the relation module 101 analyzes one or more measurement points for each of the measurement elements of the product 3 according to the positional coordinates of each of the measurement elements, and generates relation arrays, the relation arrays storing the name and the one or more measurement points of one measurement element. For example, referring to FIG. 1, the measurement element S1 is established by the points M1 to M4, thus, the relation module 101 may analyze the four measurement points M1 to M4 for the measurement element S1, and generate a relation array to store the name "S1" and the four measurement points M1 to M4. Thus, the relation array is an array that lists a name of a measurement element and the measurement point(s) in relation to the measurement element.

In block S12, the first ordered array generation module 102 selects a measurement point from the measurement points of all measurement elements, where the selected measurement point is nearest to the origin of the coordinate system of the product 3, computes distances between the measurement points from the selected measurement points using the relation arrays, and creates an order for measurement points according to the computed distances, to generate a first ordered array. A detailed description of block S12 is given in FIG. 5.

In block S13, the second ordered array generation module 103 determines if one or more contact points are generated during the measuring machine 2 moving from the first measurement point to the last measurement point of the first ordered array. The contact points means a point at where the measurement machine 2 contacts the product 3. Further in block S13, the second ordered array generation module 103 inserts a virtual measurement point into the first ordered array if a contact point is generated, to generate a second ordered array. It may be understood that, two measurement points may not be on the same plane, for example, one measurement point may be on an upper plane of the product 3 and the next measurement point may be on a side plane of the product 3. When the measuring machine 2 moves from one measurement point to the next measurement point, the measuring machine 2 may make a contact with the product 3. Thus, a contact point is generated. Such a contact may damage the measuring machine 2 or deform the product 3. Thus, a virtual measurement point is created as a substitute for an actual contact. A detailed description of block S13 is given below (and see FIG. 6).

In block S14, the path generation module 104 generates an optimal measurement path for the measuring machine 2 in measuring the product 3, according to the second ordered array. In one embodiment, the optimal measurement path is a sequence of the measurement points on the product 3, and that sequence is determined in the second ordered array. If the contacts between the measuring machine 2 and the product 3 are not considered, the optimal measurement path is generated according to the first ordered array, and block S13 can be bypassed.

In block S15, the storage module 105 stores the optimal measurement path into the storage medium 11 of the electronic device 1.

Figure 5:
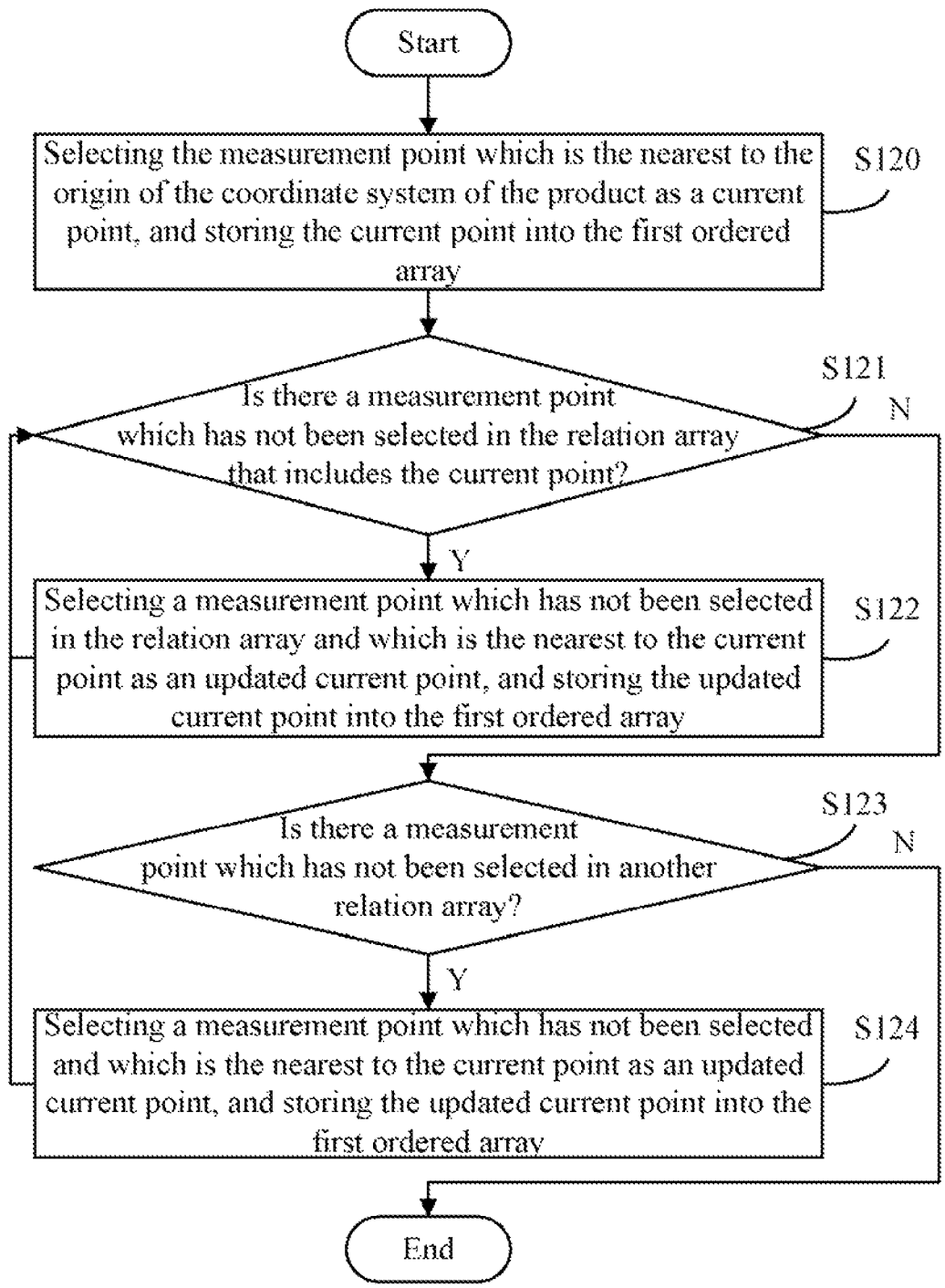
FIG. 5 is a flowchart of one embodiment detailing block S12 of FIG. 4.

FIG. 5 is a flowchart of one embodiment for detailing block S12 of FIG. 4. Depending on the embodiment, additional blocks may be added, others removed, and the ordering of the blocks may be changed.

In block S120, the first ordered array generation module 102 selects the measurement point which is the nearest to the origin of the coordinate system of the product 3 as a current point, and stores the current point into the first ordered array.

In block S121, the first ordered array generation module 102 determines if there is any measurement point which has not been selected in the relation array which includes the current point. Block S122 is implemented if there is a measurement point which has not been selected in the relation array. If all of the measurement points in the relation array have been selected, block S123 is implemented.

In block S122, the first ordered array generation module 102 selects a measurement point, which has not been selected in the relation array and which is nearest to the current point, as an updated current point, and stores the updated current point into the first ordered array. After block S122, block S121 is repeated until all of the measurement points in the relation array have been selected, and then block S123 is implemented.

In block S123, the first ordered array generation module 102 determines if there is any measurement point which has not been selected in any other relation array. Block S124 is implemented if there is a measurement point which has not been selected in any other relation array, otherwise, the procedure is at an end.

In block S124, the first ordered array generation module 102 selects a measurement point, which has not been selected and which is nearest to the current point, as an updated current point, and stores the updated current point into the first ordered array. After block S124, block S121 is repeated.

Figure 6:
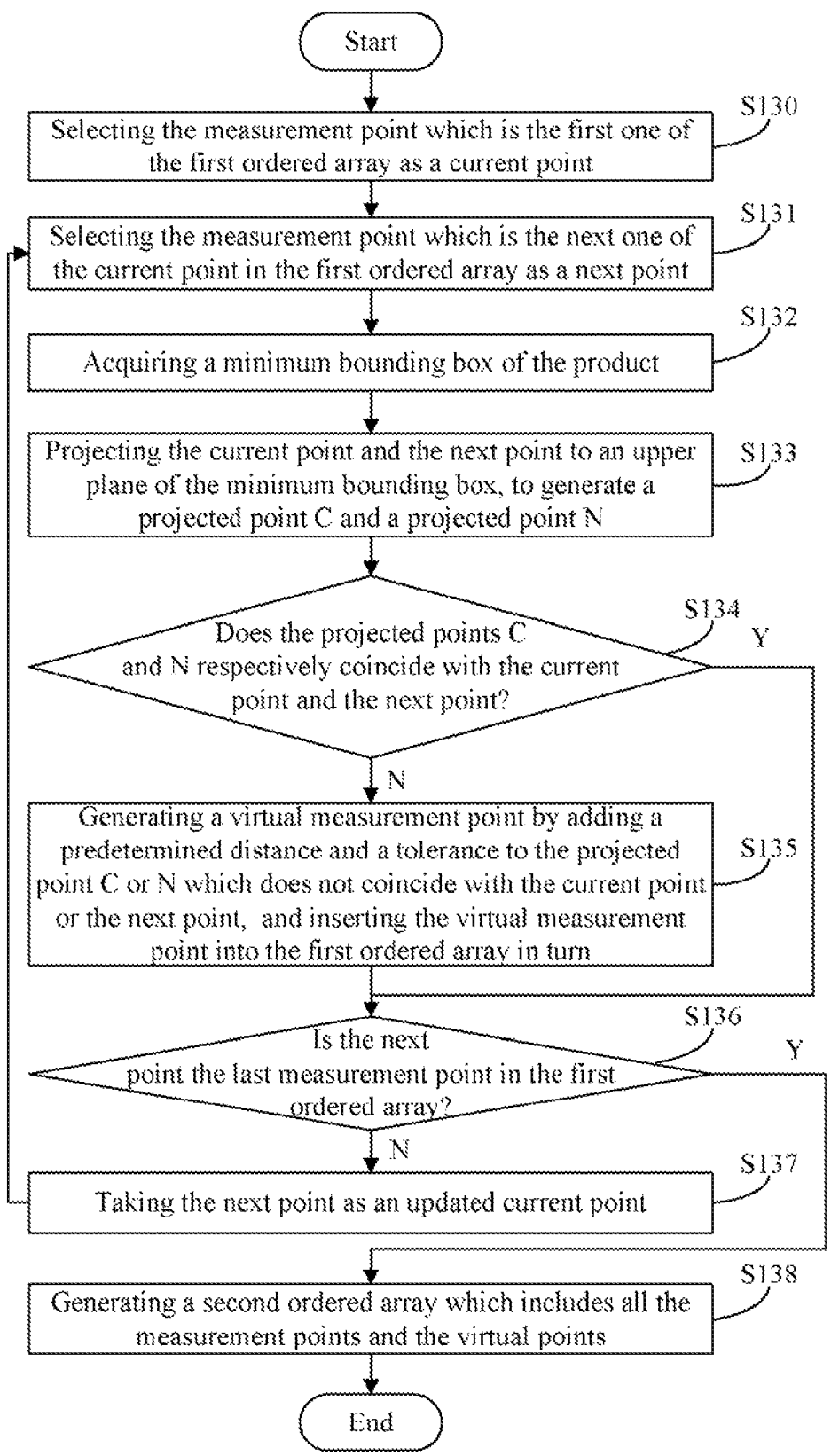
FIG. 6 is a flowchart of one embodiment detailing block S13 of FIG. 4.

FIG. 6 is a flowchart of one embodiment giving details of block S13 of FIG. 4. Depending on the embodiment, additional blocks may be added, others removed, and the ordering of the blocks may be changed.

In block S130, the second ordered array generation module 103 selects the first measurement point in the first ordered array as a current point.

In block S131, the second ordered array generation module 103 selects the measurement point next to the current point in the first ordered array as a next point.

In block S132, the second ordered array generation module 103 acquires the minimum bounding box of the product 3.

In block S133, the second ordered array generation module 103 projects the current point and the next point to an upper plane of the minimum bounding box, to generate a projected point C and a projected point N.

In block S134, the second ordered array generation module 103 determines if the projected point C and the projected point N coincide respectively with the current point and the next point. Block S135 is implemented if either the projected point C or the projected point N does not coincide with the current point or the next point. Block S136 is implemented if the projected point C and the projected point N respectively coincides with the current point and the next point.

In block S135, the second ordered array generation module 103 generates a virtual measurement point by adding a predetermined distance and a tolerance to the projected point C or to the projected point N which does not coincide with the current point or the next point, and inserts the virtual measurement point into the first ordered array.

In block S136, the second ordered array generation module 103 determines if the next point is the last measurement point in the first ordered array. Block S137 is implemented if the next point is not the last measurement point in the first ordered array. Otherwise, block S138 is implemented if the next point is the last measurement point in the first ordered array.

In block S137, the second ordered array generation module 103 takes the next point as an updated current point. Then, block S131 is repeated.

In block S138, the second ordered array generation module 103 generates the second ordered array which includes all the measurement points and the virtual measurement points.

Figure 7:
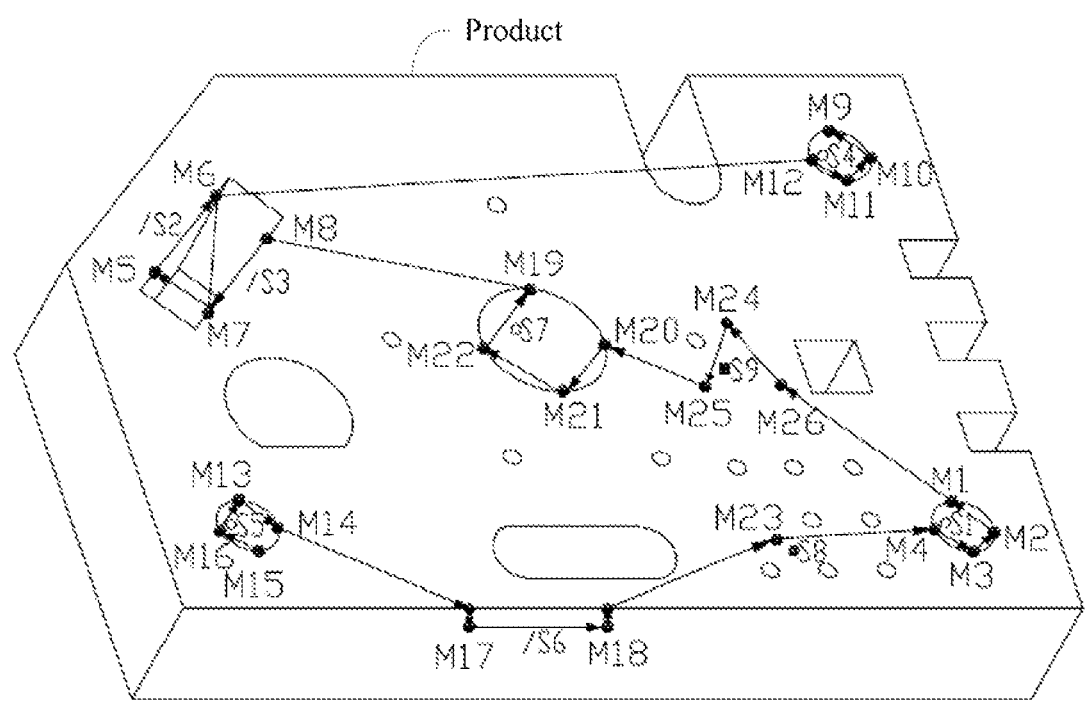
FIG. 7 illustrates an optimal measurement path for measuring the product in FIG. 1.

Using the electronic device 1 and the method of optimizing a measurement path as described above, the optimal measurement path of a measuring machine shown in FIG. 7 is generated. FIG. 7 shows that the optimal measurement path is very ordered, which results in saving measurement time.

It should be emphasized that the above-described embodiments of the present disclosure are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure is protected by the following claims.

What is claimed is:

1. A computer-implemented method of optimizing measurement paths being performed by execution of computerized code by a processor of an electronic device, the method comprising:
   (a) receiving information of a product and information of measurement elements of the product from a measuring machine, wherein the information of the product comprise a coordinate system of the product, and the information of the measurement elements comprises a name allocated to each of the measurement elements, and positional coordinates of each of the measurement elements;
   (b) analyzing one or more measurement points for each of the measurement elements according to the positional coordinates, and generating relation arrays, each of the relation arrays storing the name and the one or more measurement points of one measurement element;
   (c) selecting a measurement point from the measurement points of all the measurement elements, the selected measurement point being nearest to the origin of the coordinate system, computing distances between the measurement points from the selected measurement point using the relation arrays, and creating an order for the measurement points according to the computed distances to generate a first ordered array;
   (d) generating an optimal measurement path of the measuring machine taking measurements on the product according to the first ordered array; and
   (e) storing the optimal measurement path into a non-transitory storage medium of the electronic device.

2. The method according to claim 1, wherein (c) comprises:
   selecting the measurement point which is the nearest to the origin of the coordinate system as a current point, and storing the current point into the first ordered array;
   selecting a measurement point which has not been selected in the relation array comprising the current point, and which is the nearest to the current point, as an updated current point, and storing the updated current point into the first ordered array; and
   selecting a measurement point which has not been selected and is nearest to the current point from another relation arrays, upon condition that all measurement points of the relation array comprising the current point have been selected, as an updated current point, and storing the updated current point into the first ordered array, until all measurement points of all relation arrays have been selected.

3. The method according to claim 1, wherein the method further comprises:
   (f) determining if one or more contact points are generated during the measuring machine moving from the first measurement point to the last measurement point of the first ordered array, and inserting a virtual measurement point into the first ordered array when a contact point is generate, to create a second ordered array.

4. The method according to claim 3, wherein the information of the product further comprises a minimum bounding box of the product.

5. The method according to claim 4, wherein (f) comprises:
   (f1) selecting the measurement point which is the first one of the first ordered array as a current point;
   (f2) selecting the measurement point which is the next one of the current point in the first ordered array as a next point;
   (f3) acquiring the minimum bounding box of the product;
   (f4) projecting the current point and the next point to the upper plane of the minimum bounding box, to generate a projected point C and a projected point N;
   (f5) generating a virtual measurement point by adding a predetermined distance and a tolerance to the projected point C or the projected point N which does not coincide with the current point or the next point, and inserting the virtual measurement point into the first ordered array in turn;
   (f6) taking the next point as an updated current point upon condition that the next point is not the last measurement point in the first ordered array, and repeating (f2) to (f5); and
   (f7) creating a second ordered array which includes all the measurement points and the virtual measurement points upon condition that the next point is the last measurement point in the first ordered array.

6. The method according to claim 5, further comprising:
   generating another optimal measurement path of the measuring machine taking measurements on the product according to the second ordered array.

7. An electronic device, comprising:
   a non-transitory storage medium;
   at least one processor; and
   one or more modules that are stored in the non-transitory storage medium; and are executed by the at least one processor, the one or more modules comprising instructions to:
   (a) receive information of a product and information of measurement elements of the product from a measuring machine, wherein the information of a product comprise a coordinate system of the product, and the information of the measurement elements comprise a name allocated to each of the measurement elements and positional coordinates of each of the measurement elements;
   (b) analyze one or more measurement points for each of the measurement elements according to the positional coordinates, and generate relation arrays, each of the relation arrays storing the name and the one or more measurement points of one measurement element;
(c) select a measurement point from the measurement points of all the measurement elements, the selected measurement point being nearest to the origin of the coordinate system, compute distances between the measurement points from the selected measurement point using the relation arrays, and create an order for the measurement points according to the computed distances to generate a first ordered array;
(d) generate an optimal measurement path of the measuring machine taking measurement on the product according to the first ordered array; and
(e) store the optimal measurement path into the non-transitory storage medium.

8. The electronic device according to claim 7, wherein (c) comprises:
selecting the measurement point which is the nearest to the origin of the coordinate system as a current point, and storing the current point into the first ordered array;
selecting a measurement point which has not been selected in the relation array comprising the current point, and which is the nearest to the current point, as an updated current point, and storing the updated current point into the first ordered array; and
selecting a measurement point which has not been selected and is the nearest to the current point from another relation arrays, upon condition that all measurement points of the relation array comprising the current point have been selected, as an updated current point, and storing the updated current point into the first ordered array, until all measurement points of all relation arrays have been selected.

9. The electronic device according to claim 7, wherein the one or more modules further comprise instructions to:
determine if one or more contact points are generated during the measuring machine moving from the first measurement point to the last measurement point of the first ordered array, and insert a virtual measurement point into the first ordered array when a contact point is generated, to create a second ordered array.

10. The electronic device according to claim 9, wherein the information of the product further comprises a minimum bounding box of the product.

11. The electronic device according to claim 10, wherein (f) comprises:
(f1) selecting the measurement point which is the first one of the first ordered array as a current point;
(f2) selecting the measurement point which is the next one of the current point in the first ordered array as a next point;
(f3) acquiring the minimum bounding box of the product;
(f4) projecting the current point and the next point to the upper plane of the minimum bounding box, to generate a projected point C and a projected point N;
(f5) generating a virtual measurement point by adding a predetermined distance and a tolerance to the projected point C or the projected point N which does not coincide with the current point or the next point, and inserting the virtual measurement point into the first ordered array in turn;
(f6) taking the next point as an updated current point upon condition that the next point is not the last measurement point in the first ordered array, and repeating (f2) to (f5); and
(f7) creating a second ordered array which includes all the measurement points and the virtual measurement points upon condition that the next point is the last measurement point in the first ordered array.

12. The electronic device according to claim 11, wherein the one or more modules further comprise instructions to:
to generate another optimal measurement path of the measuring machine taking measurement on the product according to the second ordered array.

13. A non-transitory storage medium having stored thereon instructions that, when executed by a processor of an electronic device, causes the processor to perform a method of optimizing measurement paths, wherein the method comprises:
(a) receiving information of a product and information of measurement elements of the product from a measuring machine, wherein the information of the product comprise a coordinate system of the product, and the information of the measurement elements comprises a name allocated to each of the measurement elements, and positional coordinates of each of the measurement elements;
(b) analyzing one or more measurement points for each of the measurement elements according to the positional coordinates, and generating relation arrays, each of the relation arrays storing the name and the one or more measurement points of one measurement element;
(c) selecting a measurement point from the measurement points of all the measurement elements, the selected measurement point being nearest to the origin of the coordinate system, computing distances between the measurement points from the selected measurement point using the relation arrays, and creating an order for the measurement points according to the computed distances to generate a first ordered array;
(d) generating an optimal measurement path of the measuring machine taking measurements on the product according to the first ordered array; and
(e) storing the optimal measurement path into a non-transitory storage medium of the electronic device.

14. The non-transitory storage medium according to claim 13, wherein (c) comprises:
selecting the measurement point which is the nearest to the origin of the coordinate system as a current point, and storing the current point into the first ordered array;
selecting a measurement point which has not been selected in the relation array comprising the current point, and which is the nearest to the current point, as an updated current point, and storing the updated current point into the first ordered array; and
selecting a measurement point which has not been selected and is nearest to the current point from another relation arrays, upon condition that all measurement points of the relation array comprising the current point have been selected, as an updated current point, and storing the updated current point into the first ordered array, until all measurement points of all relation arrays have been selected.

15. The non-transitory storage medium according to claim 13, wherein the method further comprises:
(f) determining if one or more contact points are generated during the measuring machine moving from the first measurement point to the last measurement point of the first ordered array, and inserting a virtual measurement point into the first ordered array when a contact point is generate, to create a second ordered array.

16. The non-transitory storage medium according to claim 15, wherein the information of the product further comprise a minimum bounding box of the product.

17. The non-transitory storage medium according to claim 16, wherein (f) comprises:
- (f1) selecting the measurement point which is the first one of the first ordered array as a current point;
- (f2) selecting the measurement point which is the next one of the current point in the first ordered array as a next point;
- (f3) acquiring the minimum bounding box of the product;
- (f4) projecting the current point and the next point to the upper plane of the minimum bounding box, to generate a projected point C and a projected point N;
- (f5) generating a virtual measurement point by adding a predetermined distance and a tolerance to the projected point C or the projected point N which does not coincide with the current point or the next point, and inserting the virtual measurement point into the first ordered array in turn;
- (f6) taking the next point as an updated current point upon condition that the next point is not the last measurement point in the first ordered array, and repeating (f2) to (f5); and
- (f7) creating a second ordered array which includes all the measurement points and the virtual measurement points upon condition that the next point is the last measurement point in the first ordered array.

18. The non-transitory storage medium according to claim 17, wherein the method further comprising:
generating another optimal measurement path of the measuring machine taking measurements on the product according to the second ordered array.

* * * * *